United States Patent
Yoneima

(10) Patent No.: US 9,213,183 B2
(45) Date of Patent: Dec. 15, 2015

(54) MOUNTING AUXILIARY MEMBER AND OPTICAL SCANNING DEVICE INCLUDING THE SAME

(71) Applicant: KYOCERA DOCUMENT SOLUTIONS INC., Osaka (JP)

(72) Inventor: Yoshinobu Yoneima, Osaka (JP)

(73) Assignee: KYOCERA Document Solutions, Inc., Osaka (JP)

( * ) Notice: Subject to any disclaimer, the term of this patent is extended or adjusted under 35 U.S.C. 154(b) by 175 days.

(21) Appl. No.: 14/137,170

(22) Filed: Dec. 20, 2013

(65) Prior Publication Data

US 2014/0177019 A1    Jun. 26, 2014

(30) Foreign Application Priority Data

Dec. 25, 2012  (JP) ................................. 2012-281136

(51) Int. Cl.
| | |
|---|---|
| *G02B 26/08* | (2006.01) |
| *G02B 26/10* | (2006.01) |
| *G02B 26/12* | (2006.01) |
| *H04N 1/04* | (2006.01) |

(52) U.S. Cl.
CPC .............. *G02B 26/10* (2013.01); *G02B 26/125* (2013.01); *H04N 1/04* (2013.01)

(58) Field of Classification Search
CPC ............... G02B 26/10; G02B 26/0916; G02B 26/0841; G02B 26/125; G02B 27/0006; G02B 27/1821
USPC ........... 359/197.1, 199.3, 200.1, 213.1, 216.1
See application file for complete search history.

(56) References Cited

U.S. PATENT DOCUMENTS

| | | | |
|---|---|---|---|
| 5,533,852 A |  | 7/1996 | Matthews |
| 6,726,003 B2 * | | 4/2004 | Itoh et al. ...................... 198/788 |

FOREIGN PATENT DOCUMENTS

| | | |
|---|---|---|
| JP | H07-083743 A | 3/1995 |
| JP | H07-503780 A | 4/1995 |
| JP | 2001-317528 A | 11/2001 |
| JP | 2002-130274 A | 5/2002 |
| JP | 2002-341276 A | 11/2002 |
| JP | 2008-009285 A | 1/2008 |

OTHER PUBLICATIONS

An Office Action; "Notice of Reasons for Rejection," issued by the Japanese Patent Office on Feb. 17, 2015, which corresponds to Japanese Patent Application No. 2012-281136 and is related to U.S. Appl. No. 14/137,170.

* cited by examiner

*Primary Examiner* — Euncha Cherry
(74) *Attorney, Agent, or Firm* — Studebaker & Brackett PC

(57) ABSTRACT

A mounting auxiliary member includes a rotary member and a stationary member. The rotary member is provided in an optical scanning device, and interposed between a light source holding member holding a light source and a head part of a screw. The rotary member has a first through hole through which a shaft part of the screw penetrates and is configured so as to co-rotate with the screw as the head part of the screw comes into contact with a peripheral edge part of the first through hole. The stationary member is interposed between the rotary member and light source holding member, has a second through hole into which the shaft part of the screw penetrating through the first through hole is movably inserted, and is configured to hold the rotary member while permitting the rotary member to slidably rotate.

12 Claims, 4 Drawing Sheets

MOUNTING AUXILIARY MEMBER AND OPTICAL SCANNING DEVICE INCLUDING THE SAME

INCORPORATION BY REFERENCE

This application is based on and claims the benefit of priority from Japanese Patent application No. 2012-281136 filed on Dec. 25, 2012, the entire contents of which are incorporated herein by reference.

BACKGROUND

The present disclosure relates to a mounting auxiliary member provided in an optical scanning device configured to irradiate light on the basis of image data and to the optical scanning device including the optical scanning device.

Some optical scanning device is configured so that a laser diode holding member is formed by fastening a radiator plate holding a laser diode to a substrate by screws and is fastened to a base by screws.

However, in the above-mentioned optical scanning device, when the laser diode holding member is fastened to the base by the screw, a frictional force is generated between a head part of the screw and the laser diode holding member, and accordingly, the laser diode holding member may rotate together, i.e., co-rotates, with the screw. Therefore, it is sometimes difficult to fasten the laser diode holding member at an accurate position on the base. Accordingly, the optical scanner mentioned above may have such a problem that an optical axis and a beam pitch deviate.

In order to solve such a problem, there is an optical scanning device configured so that a shaft part of a fastening screw is penetrated from the inside of an optical box through a through hole perforated in a frame wall of the optical box, a leading part of the fastening screw is screwed to a screw hole perforated in a laser diode holder disposed outside the optical box, and accordingly, the laser diode holder is fastened to the frame wall. In this optical scanning device, because the head part of the fastening screw is not in contact with the laser diode holder, it is possible to suppress co-rotation of the laser diode holder caused by the friction with the fastening screw.

However, in the latter optical scanning device mentioned above, because the head part of the fastening screw faces to the inside of the optical box, it is required to rotate the head part of the fastening screw by using a tool within the optical box. Due to that, there is a problem that the tool interferes with other members disposed within the optical box. Still further, even if the fastening screw faces to the outside of the optical box and the laser diode holder is disposed inside the optical box, because a worker is required to position the laser diode holder inside the optical box, there is a possibility of interfering with the other members within the optical box.

SUMMARY

In accordance with an embodiment of the present disclosure, a mounting auxiliary member includes a rotary member and a stationary member. The rotary member is provided in an optical scanning device configured to irradiate a laser beam on the basis of image data. The rotary member is interposed between a light source holding member holding a light source and a head part of a screw when a leading end part of the screw penetrating through the light source holding member is screwed to a screw hole perforated in a support member in order to support the light source holding member to the support member. The rotary member has a first through hole through which a shaft part of the screw penetrates. The rotary member is configured so as to co-rotate with the screw as the head part of the screw comes into contact with a peripheral edge part of the first through hole. The stationary member is interposed between the rotary member and light source holding member. The stationary member has a second through hole into which the shaft part of the screw penetrating through the first through hole is movably inserted, and is configured to hold the rotary member while permitting the rotary member to slidably rotate.

In accordance with an embodiment of the present disclosure, an optical scanning device includes a mounting auxiliary member. The mounting auxiliary member is configured to irradiate a laser beam on the basis of image data. The mounting auxiliary member is interposed between a light source holding member holding a light source and a head part of a screw when a leading end part of the screw penetrating through the light source holding member is screwed to a screw hole perforated in a support member to support the light source holding member to the support member. The mounting auxiliary member includes a rotary member and a stationary member. The rotary member has a first through hole through which a shaft part of the screw penetrates. The rotary member is configured so as to co-rotate with the screw as the head part of the screw comes into contact with a peripheral edge part of the first through hole. The stationary member is interposed between the rotary member and light source holding member. The stationary member has a second through hole into which the shaft part of the screw penetrating through the first through hole is movably inserted, and is configured to hold the rotary member while permitting the rotary member to slidably rotate.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
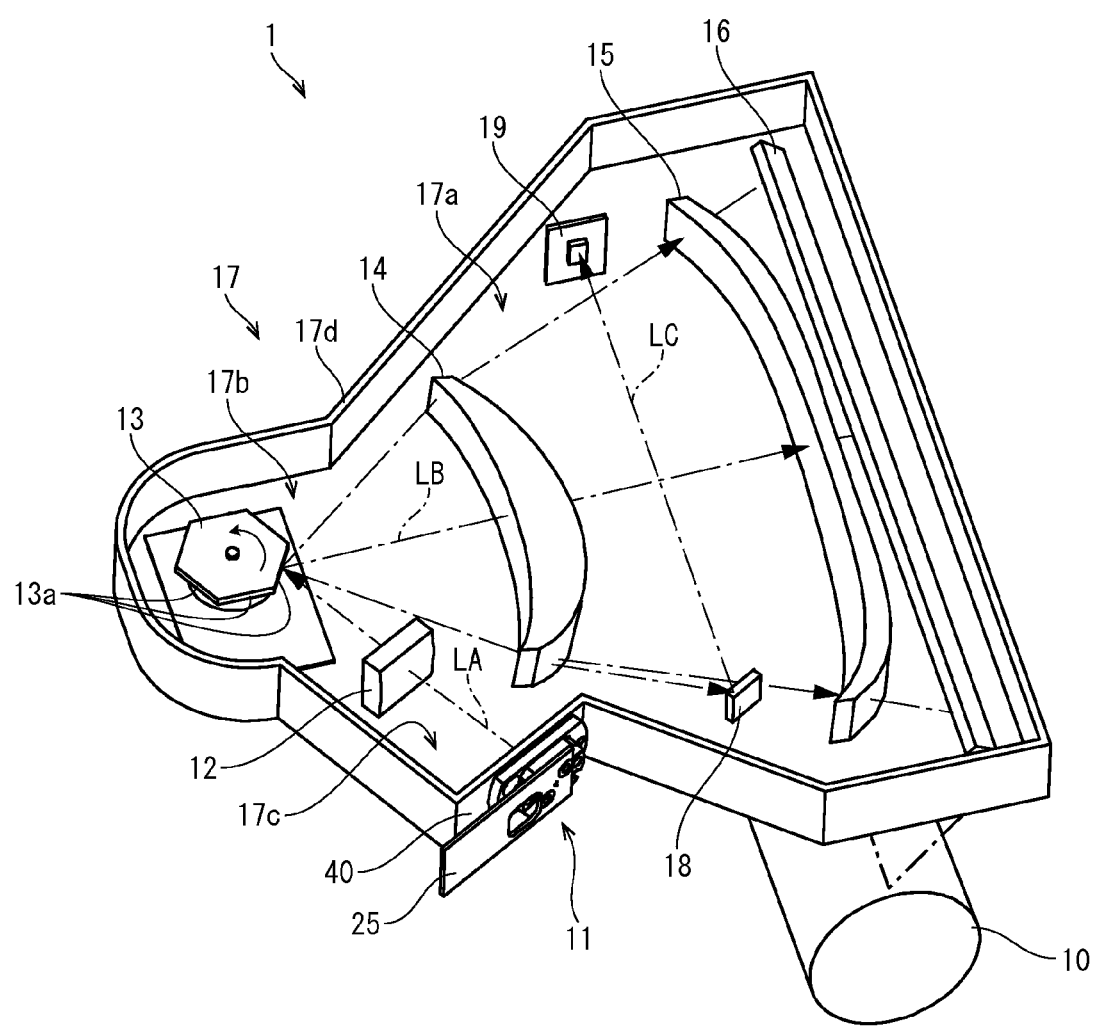
FIG. 1 is a perspective view showing an optical scanning according to an embodiment of the present disclosure.

In the following, an embodiment of the present disclosure will be described with reference to the drawings. FIG. 1 is a perspective view of an optical scanning device 1 according to the embodiment.

The optical scanning device 1 of the present embodiment is installed, for example, in a digital copying machine and is configured to irradiate light (laser beam) on the basis of image data read by a document reading part or image data read from an external personal computer. The optical scanning device 1 scans the irradiation light on an outer peripheral surface of a photosensitive drum 10.

As shown in FIG. 1, the photosensitive drum 10 has a photosensitive layer on the outer peripheral surface and is rotatably pivoted around an axial line. The outer peripheral surface of the photosensitive drum 10 is electrically charged by a charging unit (not shown). After that, an electrostatic latent image is formed by a laser beam irradiated from the optical scanning device 1. Then, an image based on the image data is transferred to a recording medium by a developer, a transfer device, and others (either not shown).

As shown in FIG. 1, the optical scanning device 1 includes a light source unit 11 configured to irradiate the laser beam, a cylindrical lens 12 configured to converge the irradiated laser beam, a polygon mirror 13 configured to reflect the converged laser beam, a first fθ lens 14 and a second fθ lens 15 configured to scan the reflected laser beam in a main scanning direction at constant velocity, a return mirror 16 configured to reflect the laser beam passed through the fθ lenses 14 and 15 to irradiate the laser beam to the photosensitive drum 10, and an optical box 17 configured to house the respective components.

Figure 2:
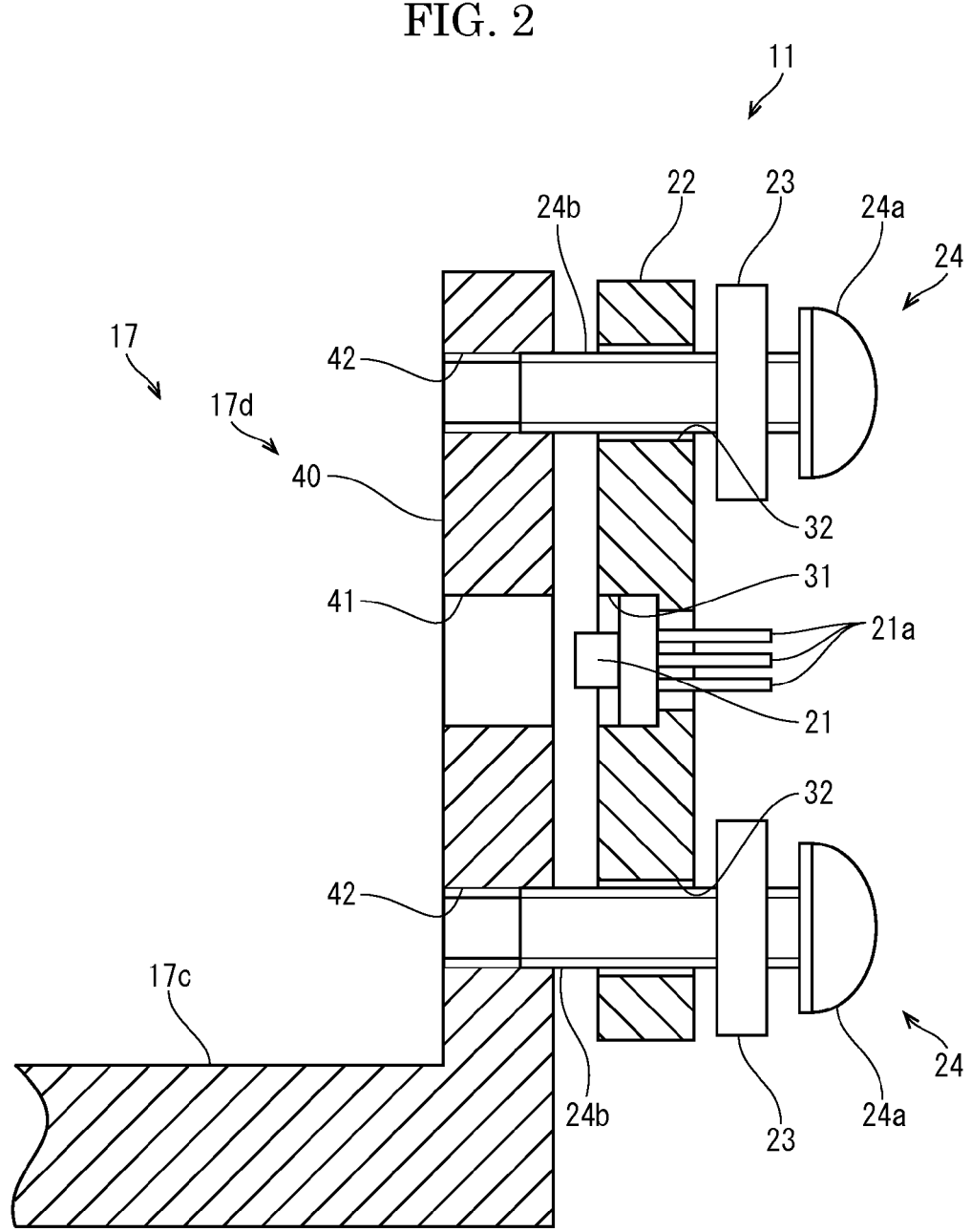
FIG. 2 is a sectional side view showing a support member, a light source holding member, and a mounting auxiliary member provided in the optical scanning device of the embodiment of the present disclosure.

The light source unit 11 includes a laser diode 21 (a light source), a light source holding member 22 configured to hold the laser diode 21, and a plural number (e.g. two) of mounting auxiliary members 23 interposed between the light source holding member 22 and head parts 24a of fastening screws 24 in order to screw and support the light source holding member 22 to the optical box 17 (see FIG. 2). The light source unit 11 also includes a control substrate 25 that is connected to the laser diode 21 to control the irradiation of the laser beam (see FIG. 1). The light source unit 11 irradiates the laser beam (see a chain line arrow LA shown in FIG. 1) from the laser diode 21 on the basis of image data.

The cylindrical lens 12 converges the laser beam (the chain line arrow LA) irradiated from the light source unit 11 in a sub-scanning direction.

The polygon mirror 13 is formed, for example, substantially in a regular hexagon in a plan view and has refection surfaces 13a formed on its six external side faces. To the polygon mirror 13, a rotational shaft of a motor (not shown) is connected. The polygon mirror 13 rotates at constant velocity around an axial line (see an arrow shown in FIG. 1) as the motor is driven.

The first fθ lens 14 and second fθ lens 15 condense the laser beam (see a chain line arrow LB shown in FIG. 1) deflected by the polygon mirror 13 to a flat image surface in stages and scan the condensed light. Thereby, the laser beam (the chain line arrow LB) deflected by the polygon mirror 13 is scanned in the main scanning direction at constant velocity on the outer peripheral surface of the photosensitive drum 10.

The return mirror 16 reflects the laser beam (the chain line arrow LB) passed through the first fθ lens 14 and second fθ lens 15 such that the laser beam advances to the photosensitive drum 10 facing below the optical scanning device 1.

The optical box 17 has an asymmetrical bottom surface formed by a main part 17a formed substantially in a pentagonal shape in a plan view, a first projecting part 17b semicircularly protruding at one apex part of the main part 17a, and a second projecting part 17c formed by one corner protruded from between the main part 17a and first projecting part 17b. Around an outer edge of the optical box 17, a wall 17d is erected. That is, the optical box 17 is formed integrally in a tray-liked shape as a whole. The optical box 17 may be formed of metal or resin.

The light source unit 11 mentioned above is fixed from the outside to a support member 40 which is a part of the wall 17d at the second projecting part 17c. The polygon mirror 13 is disposed in the first projecting part 17b and the cylindrical lens 12 is disposed between the light source unit 11 and polygon mirror 13. The first fθ lens 14, second fθ lens 15, and return mirror 16 are disposed in the main part 17a in an order close to the polygon mirror 13.

The irradiation of the laser beam from the optical scanning device 1 to the photosensitive drum 10 will be briefly described below. The laser beam (the chain line arrow LA) irradiated from the laser diode 21 of the light source unit 11 is inputted to the rotating polygonal mirror 13 through the cylindrical lens 12. The laser beam (the chain line arrow LB) reflected by the polygon mirror 13a of the polygon mirror 13 is scanned in the main scanning direction. The laser beam scanned in the main scanning direction passes through the first fθ lens 14 and second fθ lens 15, is reflected by the return mirror 16, and is irradiated to the outer peripheral surface of the photosensitive drum 10. Thereby, an electrostatic latent image is formed on the outer peripheral surface of the photosensitive drum 10.

Incidentally, in the laser beam (the chain line arrow LB) deflected and scanned by the polygon mirror 13, the laser beam in a range being not used for scanning and exposing the photosensitive drum 10 is reflected by a pickup mirror 18 and is inputted to a synchronization detection sensor 19 (see a chain line arrow LC shown in FIG. 1). By detecting the laser beam (the chain line arrow LC) by the synchronization detection sensor 19, for example, a control device (not shown) of the digital copying machine can perceive that a rotation position of the polygon mirror 13 has reached a scanning starting position. Thus, the control device can control the exposure of the photosensitive drum 10 performed by the optical scanning device 1 at accurate timing.

Figure 3A:
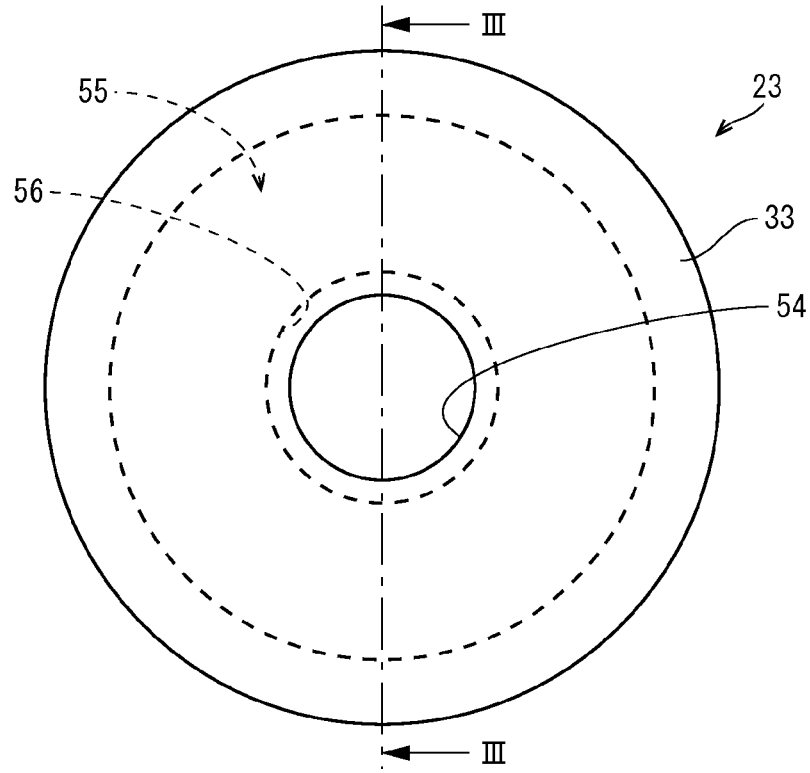
FIG. 3A is a front view showing the mounting auxiliary member of the embodiment of the present disclosure.
Figure 3B:
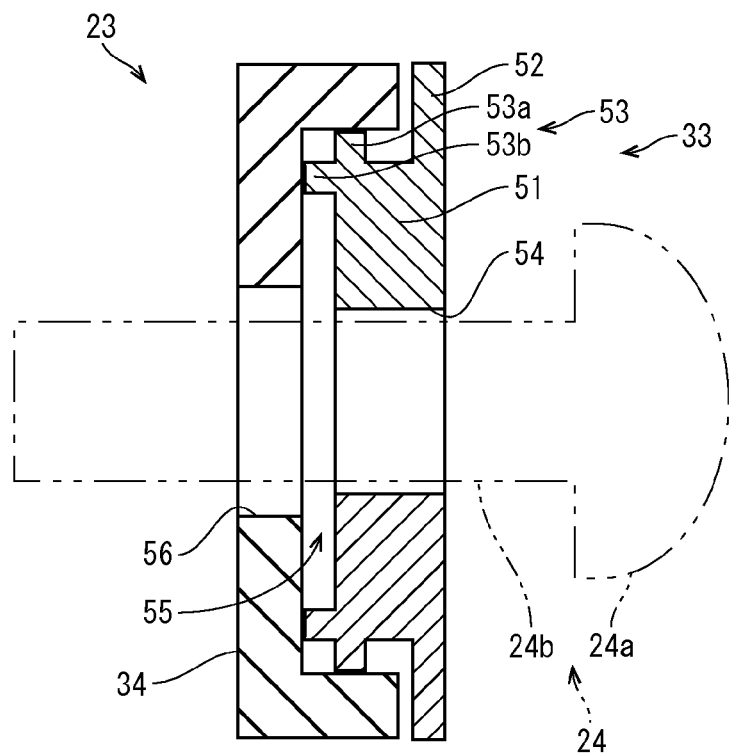
FIG. 3B is a section view taken along a line III-III in FIG. 3A.

Next, the light source unit 11 will be described in detail with reference to FIGS. 2, 3A and 3B. FIG. 2 is a sectional side view of the support member 40, light source holding member 22, and mounting auxiliary members 23 provided in the optical scanning device 1 according to the present embodiment. FIG. 3A is a front view of the mounting auxiliary member 23 of the present embodiment, and FIG. 3B is a section view taken along a line III-III in FIG. 3A.

As mentioned above, the light source unit 11 includes the laser diode 21, light source holding member 22, two mounting auxiliary members 23 and the control substrate 25 (see FIG. 1).

As shown in FIG. 2, the light source holding member 22 is formed substantially in a rectangular plate-liked shape. The light source holding member 22 has a light source fixed hole 31 into which the laser diode 21 is fitted, and a plural number (e.g. two) of holding member through holes 32 through which shaft parts 24b of the fastening screws 24 are penetrated.

The light source fixed hole 31 is perforated substantially at a center part of the light source holding member 22 in upward and downward directions through in a plate thickness direction. The laser diode 21 is fitted into the light source fixed hole 31 from an inner surface side coming into contact with the wall 17d (the support member 40) of the optical box 17. Then, from an opposite surface side (an outer surface side) in the light source fixed hole 31, three connecting terminals 21a of the laser diode 21 are exposed. The respective connecting terminals 21a are electrically connected to the control substrate 25.

The holding member through holes 32 are perforated above and below the light source fixed hole 31 so as to penetrate in the plate thickness direction. In each holding member through hole 32, the shaft part 24b of the fastening screw 24 fastening the light source holding member 22 to the support member 40 of the wall 17d is movably inserted.

The light source holding member 22 is brought into contact with the support member 40 of the wall 17d from the outside. The support member 40 has an irradiation hole 41 through which the laser beam irradiated from the laser diode 21 passes and a plural number (e.g. two) of screw holes 42 to which the leading parts of the fastening screws 24 are screwed. A male thread may be formed on the shaft part 24b of the fastening screw 24 and a female thread may be formed on an inner circumference surface of the screw hole 42.

The irradiation hole 41 is perforated at a position facing to the light source fixed hole 31 of the light source holding member 22 so as to penetrate in the thickness direction. Each screw hole 42 is perforated at a position facing to each holding member through hole 32 of the light source holding member 22 so as to penetrate in the thickness direction.

Next, one of two mounting auxiliary members 23 mentioned above will be described. As shown in FIG. 3A, the mounting auxiliary member 23 is formed in a ringed plate-liked shape as a whole. As shown in FIG. 3B, the mounting auxiliary member 23 has a rotary member 33 configured so as to come into contact with the head part 24a of the fastening screw 24 and to co-rotate with the fastening screw 24, and a stationary member 34 interposed between the rotary member 33 and light source holding member 22 and configured to hold the rotary member 33 while permitting the rotary member 33 to rotate in sliding contact with the stationary member 34. In order to simplify the explanation hereinafter, the side to which the head part 24a of the fastening screw 24 faces will be called as a "base end" and the side to which the light source holding member 22 faces will be called as a "leading end". Moreover, a direction connecting the base end and leading end will be called as an "axial direction".

The rotary member 33 is formed, for example, substantially in a cylindrical shape by resin excellent in slidability and wear resistance, such as polyacetal (PTFE). The rotary member 33 has a substantially cylindrical body part 51, a flange part 52 projecting from the body part 51 at the base end side, and a sliding contact part 53 projecting from the body part 51 at the leading end side.

The body part 51 is fitted into a concave part 55 of the stationary member 34 in a state having play. At a center of the body part 51, a first through hole 54 is perforated so as to penetrate through in the axial direction. The first through hole 54 is formed with a diameter so as to make the first through hole 54 become a state having play from the shaft part 24b of the fastening screw 24. On a surface at the base end side of the body part 51, the head part 24a of the fastening screw 24 comes into contact with a peripheral edge part of the first through hole 54.

The flange part 52 is formed so as to project at the base end side of the body part 51 in a radial direction. The flange part 52 is configured so as to not come into contact with the stationary member 34 in a state that the body part 51 is idly fitted into the concave part 55. The flange part 52 may be omitted because the flange part 52 is provided just to bring about an appearance of oneness of the mounting auxiliary member 23.

The sliding contact part 53 is composed of a first sliding contact part 53a projecting in the radial direction and a second sliding contact part 53bb projecting in the axial direction, at the leading end side of the body part 51. The first sliding contact part 53a and second sliding contact part 53b have a rectangular shape in section. Among the first sliding contact part 53a and second sliding contact part 53b, either one or both parts may be omitted. In such a case, the body part 51 may come into sliding contact with a side wall face and a bottom face of the concave part 55.

The stationary member 34 is formed, for example, substantially into a cylindrical shape by metal excellent in abrasion resistance, such as bearing steel (high carbon chromium bearing steel). The stationary member 34 is formed such that the concave part 55 rotationally and slidably holding the rotary member 33 is denting at the base end side. The first sliding contact part 53a of the sliding contact part 53 mentioned above is in sliding contact with the side wall face of the concave part 55. The second sliding contact part 53b of the rotary member 33 mentioned above is in sliding contact with the bottom face of the concave part 55. Thus, by bringing the sliding contact parts 53a and 53b into sliding contact with the concave part 55, the stationary member 34 holds the rotary member 33 in a state permitting the rotary member 33 to rotate in the sliding contact with the stationary member 34.

At a center of the stationary member 34 (the concave part 55), a second through hole 56 is perforated so as to penetrate through in the axial direction. The second through hole 56 is formed with a diameter so as to make the second through hole 56 become a state having play from the stem part 24b of the fastening screw 24. The second through hole 56 is perforated at a position facing to the first through hole 54 in a state that the rotary member 33 is held by the stationary member 34. In the second through hole 56, the shaft part 24b of the fastening screw 24 penetrating through the first through hole 54 is movably inserted.

Here, the rotary member 33 has a coefficient of friction smaller than that of the light source holding member 22. That is, a frictional force between the rotary member 33 and stationary member 34 is smaller than a frictional force between the stationary member 34 and light source holding member 22. Materials of the light source holding member 22, the rotary member 33 and the stationary member 34 are selected, respectively, such that the relationship of the frictional forces mentioned above is determined.

It is also arranged such that an inner diameter (D2) of the second through hole 56 of the stationary member 34 is larger than an inner diameter (D1) of the first through hole 54 of the rotary member 33. It is further arranged such that a difference (i.e. $\Delta d1 = D2 - D1$) of the inner diameters of the second through hole 56 and first through hole 54 is larger than twice of a difference (i.e. $\Delta d2 = D4 - D3$) between an outer diameter (D3) of the rotary member 33 (accurately, the first sliding contact part 53a) and an inner diameter (D4) of the concave part 55 ($\Delta d1 > \Delta d2 * 2$).

Next, a procedure for fastening the light source holding member 22 and mounting auxiliary member 23 to the support member 40 by the fastening screw 24 will be described. Here, one of two mounting auxiliary members 23 mentioned above will be described. The laser diode 21 is assumed to be fitted and held in the light source fixed hole 31 of the light source holding member 22.

At first, a worker makes each fastening screw 24 inserted through each mounting auxiliary member 23. Specifically, the worker inserts the shaft part 24b of the fastening screw 24 through the first through hole 54 and second through hole 56 from the side of the rotary member (the base end side) in a state that the rotary member 33 is held in the concave part 55 of the stationary member 34. Then, the worker inserts the shaft part 24b of the fastening screw 24 projecting from the leading end side of each mounting auxiliary member 23 through each holding member through hole 32 from the base end side of the light source holding member 22.

Subsequently, the worker brings the surface on the leading end side of the light source holding member 22 into contact with the support member 40 while adjusting their position. Specifically, the worker matches the position of the laser diode 21 with that of the irradiation hole 41 of the support member 40 and the position of each holding member through hole 32 of the light source holding member 22 with that of each screw hole 42 of the support member 40. In such a condition, the worker rotates each fastening screw 24 by means of a tool to screw the leading end part of the fastening screw 24 penetrating through the light source holding member 22 to the screw hole 42.

At that time, the fastening screw 24 rotates in a state that the head part 24a is in contact with the rotary member 33. Therefore, the rotary member 33 of the mounting auxiliary member 23 co-rotates due to the friction with the head part 24a of the fastening screw 24.

Meanwhile, the stationary member 34 of the mounting auxiliary member 23 comes into contact with the light source holding member 22, while slidably and rotably holds the rotary member 33. Therefore, even if the rotary member 33 is rotated, co-rotation of the stationary member 34 is prevented.

As described above, when each fastening screw 24 is fastened through each mounting auxiliary member 23, the head part 24a of each fastening screw 24 comes into tight contact with the peripheral edge part around the first through hole 54 of each rotary member 33 and each rotary member 33 comes into tight contact with each stationary member 34. Then, each mounting auxiliary member 23 (each stationary member 34) also comes into tight contact with the light source holding member 22, and the light source holding member 22 comes into tight contact with the support member 40. That is, the light source holding member 22 prevents the co-rotation due to the rotation of the fastening screw 24, and therefore, is mounted to the support member 40 accurately at a desirable position.

According to the present embodiment, the rotary member 33 co-rotates with the rotation of the fastening screw 24 because the head part 24a of the fastening screw comes into contact with the rotary member 33. Meanwhile, the stationary member 34 is not in contact with the head part 24a of the fastening screw 24. It is also so arranged that the frictional force between the rotary member 33 and stationary member 34 is smaller than the frictional force between the stationary member 34 and light source holding member 22. Due to that, a force in a rotational direction of the rotary member 33 cannot rotate the stationary member 34 against the frictional force between the stationary member 34 and light source holding member 22. Accordingly, it is possible to effectively suppress the force in the rotational direction of the rotary member 33 from being transmitted to the light source holding member 22 via the stationary member 34.

Moreover, according to the present embodiment, the shaft part 24b of the fastening screw 24 is inserted into the second through hole 56 of the stationary member 34 in a state having a spatial margin. That is, the shaft part 24b of the fastening screw 24 penetrates through the second through hole 56 in a state having an enough gap from the inner circumference surface of the second through hole 56. Due to that, the shaft part 24b of the fastening screw 24 is not in contact with the second through hole 56, and hence, it is possible to reliably prevent the force in the rotational direction of the fastening screw 24 from being transmitted to the stationary member 34.

As described above, in the mounting auxiliary member 23 of the present embodiment, the stationary member 34 is not co-rotated with the rotation of the fastening screw 24. That is, the stationary member 34 suppresses the force in the rotational direction of the rotary member from being transmitted to the light source holding member 22. Accordingly, it is possible to ignore the co-rotation caused by the rotation of the fastening screw 24 and to mount the light source holding member 22 to the support member 40 accurately at the desirable position. This makes it possible to adequately prevent a deviation or the like of an optical axis and a beam pitch of the laser diode 21.

Furthermore, according to the present embodiment, because the screw hole 42 to which the leading end part of the fastening screw 24 is screwed is perforated in the support member 40, it is possible to mount the light source unit 11 (the light source holding member 22 and mounting auxiliary member 23) from the outside of the support member 40 (the optical box 17) by the fastening screw 24. Accordingly, when the works for mounting the light source unit 11 are carried out, the tool or the like is not interfered by the polygon mirror 13, the various lenses 12, 14 and 15, and others disposed inside the optical box 17. That is, it is possible to mount the light source holding member 22 to the support member 40 from an arbitrary position by the fastening screw 24 while taking an arrangement of the components supported by the optical box 17 into consideration. This makes it possible to mount the light source holding member 22 to the support member 40 while effectively preventing the interference in the components supported by the optical box 17.

Figure 4:
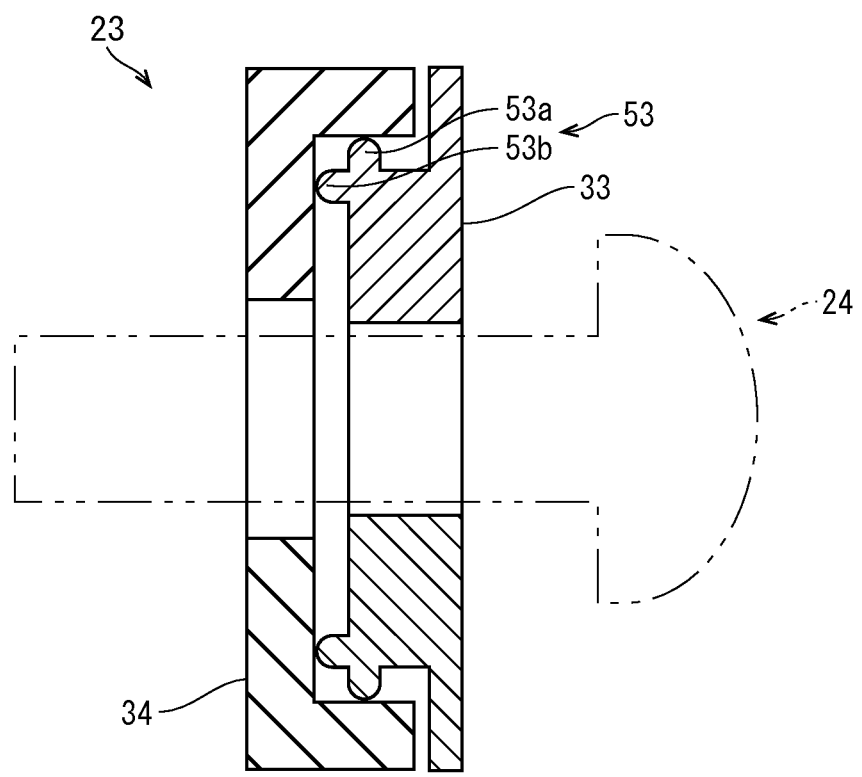
FIG. 4 is a sectional side view showing the mounting auxiliary member as a modified example of the embodiment of the present disclosure.

Next, a modified example of the present embodiment will be briefly described. FIG. 4 is a sectional side view of the mounting auxiliary member 23 as the modified example of the embodiment.

The mount auxiliary member 23 of the above-described embodiment is configured so that the first sliding contact part 53a and second sliding contact part 53b of the rotary member 33 have been formed into the rectangular shape in section. Instead of that configuration, the modified example of the present embodiment may be configured so that at least one of the first sliding contact part 53a and second sliding contact part 53b is formed into an arc-shape (a round shape) in section. As shown in FIG. 4, the sliding contact parts 53a and 53b in sliding contact with the stationary member are formed in the round shape. The other configurations of the mounting auxiliary member 23 are the same with the mounting auxiliary member 23 of the above-described embodiment, an overlapped explanation will be omitted here.

According to the modified example of the present embodiment, a sliding contact area between the rotary member 33 and stationary member 34 can be reduced. Therefore, it is possible to reduce the frictional force between the rotary member 33 and stationary member 34 with respect to a fastening load of the fastening screw 24. This makes it possible to prevent the co-rotation of the light source holding member 22 with the rotation of the fastening screw 24.

while the preferable embodiment and its modified example of the mounting auxiliary member 23 and the optical scanning device 1 of the present disclosure have been described above and various technically preferable configurations have been illustrated, a technical range of the disclosure is not to be restricted by the description and illustration of the embodiment. Further, the components in the embodiment of the disclosure may be suitably replaced with other components, or variously combined with the other components. The claims are not restricted by the description of the embodiment.

What is claimed is:

1. A mounting auxiliary member comprising:
   a rotary member provided in an optical scanning device configured to irradiate a laser beam on the basis of image data, interposed between a light source holding member holding a light source and a head part of a screw when a leading end part of the screw penetrating through the light source holding member is screwed to a screw hole perforated in a support member in order to support the light source holding member to the support member, and configured to have a first through hole through which a shaft part of the screw penetrates so as to co-rotate with the screw as the head part of the screw comes into contact with a peripheral edge part of the first through hole, and a stationary member interposed between the rotary member and light source holding member, and configured to have a second through hole into which the shaft part of the screw penetrating through the first through hole is movably inserted and to hold the rotary member while permitting the rotary member to slidably rotate.

2. The mounting auxiliary member according to claim 1, wherein
the rotary member is configured to have a coefficient of friction smaller than that of the light source holding member.

3. The mounting auxiliary member according to claim 1, wherein
the rotary member is formed in a cylindrical shape and has the first through hole at the center,
the stationary member has a circular concave part holding the rotary member while permitting the rotary member to slidingly rotate and has the second through hole at the center, and
an inner diameter of the second through hole is larger than an inner diameter of the first through hole, and a difference between the inner diameter of the second through hole and inner diameter of the first through hole is twice or more as large as a difference between an outer diameter of the rotary member and an inner diameter of the concave part.

4. The mounting auxiliary member according to claim 1, wherein
the rotary member has a sliding contact part in sliding contact with the stationary member, and the sliding contact part is formed in an arc shape in section.

5. The mounting auxiliary member according to claim 1, wherein
the stationary member has a circular concave part holding the rotary member while permitting the rotary member to slidingly rotate, and
the rotary member is formed in a cylindrical shape and has a first sliding contact part in sliding contact with a side wall face of the concave part and a second sliding contact part in sliding contact with a bottom face of the concave part.

6. The mounting auxiliary member according to claim 1, wherein
the rotary member is formed of polyacetal, and
the stationary member is formed of high carbon chrome bearing steel.

7. An optical scanning device, which is configured to irradiate a laser beam on the basis of image data, comprising:
a mounting auxiliary member interposed between a light source holding member holding a light source and a head part of a screw when a leading end part of the screw penetrating through the light source holding member is screwed to a screw hole perforated in a support member in order to support the light source holding member to the support member,
wherein the mounting auxiliary member includes:
a rotary member having a first through hole through which a shaft part of the screw penetrates and configured so as to co-rotate with the screw as the head part of the screw comes into contact with a peripheral edge part of the first through hole; and
a stationary member interposed between the rotary member and light source holding member, having a second through hole into which the shaft part of the screw penetrating through the first through hole is movably inserted, and configured to hold the rotary member while permitting the rotary member to slidably rotate.

8. The optical scanning device according to claim 7, wherein
the rotary member is configured to have a coefficient of friction smaller than that of the light source holding member.

9. The optical scanning device according to claim 7, wherein
the rotary member is formed in a cylindrical shape and has the first through hole at the center,
the stationary member has a circular concave part holding the rotary member while permitting the rotary member to slidingly rotate and has the second through hole at the center, and
an inner diameter of the second through hole is larger than an inner diameter of the first through hole, and a difference between the inner diameter of the second through hole and inner diameter of the first through hole is twice or more as large as a difference between an outer diameter of the rotary member and an inner diameter of the concave part.

10. The optical scanning device according to claim 7, wherein
the rotary member has a sliding contact part in sliding contact with the stationary member, and the sliding contact part is formed in an arc shape in section.

11. The optical scanning device according to claim 7, wherein
the stationary member has a circular concave part holding the rotary member while permitting the rotary member to slidingly rotate, and
the rotary member is formed in a cylindrical shape and has a first sliding contact part in sliding contact with a side wall face of the concave part and a second sliding contact part in sliding contact with a bottom face of the concave part.

12. The optical scanning device according to claim 7, wherein
the rotary member is formed of polyacetal, and
the stationary member is formed of high carbon chrome bearing steel.

* * * * *